US012561911B2

(12) United States Patent
Kim et al.

(10) Patent No.: US 12,561,911 B2
(45) Date of Patent: Feb. 24, 2026

(54) 3D CAGE GENERATION USING SIGNED DISTANCE FUNCTION APPROXIMANT

(71) Applicant: Roblox Corporation, San Mateo, CA (US)

(72) Inventors: Byungmoon Kim, San Jose, CA (US); Murilo Gondim Coutinho, Houston, TX (US); Jonathan Lucka, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 137 days.

(21) Appl. No.: 18/371,028

(22) Filed: Sep. 21, 2023

(65) Prior Publication Data

US 2025/0104353 A1 Mar. 27, 2025

(51) Int. Cl.
*G06T 17/20* (2006.01)
(52) U.S. Cl.
CPC .................................... *G06T 17/20* (2013.01)

(58) Field of Classification Search
None
See application file for complete search history.

(56) References Cited

U.S. PATENT DOCUMENTS 11,615,601 B2 3/2023 Makeev et al.

OTHER PUBLICATIONS

Sacht et al., "Nested Cages", ACM, 2015. (Year: 2015).*
Carr et al., "Reconstruction and Representation of 3D Objects with Radial Basis Functions", ACM, 2001. (Year: 2001).*

* cited by examiner

*Primary Examiner* — Nicholas R Wilson
(74) *Attorney, Agent, or Firm* — IP Spring

(57) ABSTRACT

Some implementations relate to methods, systems, and computer-readable media to generate 3D objects including 3D meshes and 3D cages. A signed distance function (SDF) approximant for a 3D mesh is determined by combining radial basis functions (RBFs) originating on the 3D mesh. A cage for the 3D mesh is generated by positioning cage vertices using the SDF approximant such that the cage overlays the 3D mesh. The generated 3D object includes the 3D mesh and the cage.

18 Claims, 10 Drawing Sheets

301 — DETERMINE SIGNED DISTANCE APPROXIMANT FOR 3D MESH

302 — GENERATE CAGE FOR 3D MESH

303 — GENERATE 3D OBJECT INCLUDING 3D MESH AND CAGE

501    EVALUATE RBF AT EACH VERTEX

502    DETERMINE WEIGHTS SOLVING LINEAR SYSTEM

503    DETERMINE AVERAGE MAGNITUDE OF GRADIENT VECTORS

504    NORMALIZE WEIGHTS

505    SUM WEIGHTED RBFs

801 — EVALUATE RBF AT OFFSET POINT PAIRS

802 — DETERMINE WEIGHTS SOLVING NONLINEAR SYSTEM

803 — SUM WEIGHTED RBFs

3D CAGE GENERATION USING SIGNED DISTANCE FUNCTION APPROXIMANT

TECHNICAL FIELD

Implementations relate generally to automated 3D mesh cage generation.

BACKGROUND

Multi-user electronic gaming environments typically involve the use of avatars, which represent the players in an electronic game. Avatars are often three-dimensional (3D) avatars that differ in geometry/shapes from one avatar to another. For example, avatars may have different body shapes (e.g., tall, short, muscular, thin, male, female, human, animal, alien, etc.), number and types of limbs, and are customizable with multiple pieces clothing and/or accessories worn by the avatar (e.g., shirt worn over the torso, jacket worn over the shirt, scarf worn over the jacket, hat worn over the head, etc.).

To provide clothing and/or accessories for avatars, game developers traditionally use a unified topology for the body and clothing, so that the geometry of the clothing fits the geometry of the body. Thus, these techniques use pre-defined shapes to achieve some rudimentary geometry-to-geometry matching between the clothing and the body. However, such techniques (due to the presence of pre-defined shapes) provide limited capability to customize body shapes and clothing.

When more customization is needed (e.g., due to non-uniform body shapes of avatars and clothing), more intensive user input and graphical programming is required. For instance, these techniques require the creator user (e.g., one that provides the clothing items and/or different body shapes) to perform complex computations in order to graphically generate clothing having geometry that matches geometry of the body. These processes are complex, and also require close coordination and cooperation between body shape creators and clothing creators.

SUMMARY

Aspects of the disclosure relate to methods, systems, and computer-readable media to generate 3D objects including 3D meshes and 3D cages.

In one aspect, a method is described. The method may comprise determining a signed distance function (SDF) approximant for a three-dimensional (3D) mesh by combining a plurality of radial basis functions (RBFs), where each of the plurality of radial basis functions has an origin on the 3D mesh; generating a cage for the 3D mesh, the cage comprising a plurality of cage vertices, by positioning the plurality of cage vertices using the SDF approximant such that the cage overlays the 3D mesh; and generating a 3D object comprising the 3D mesh and the cage.

In some implementations of the method, the 3D mesh comprises a plurality of mesh vertices and the origin for each RBF is located at a respective mesh vertex.

In some implementations of the method, generating the cage for the 3D mesh comprises determining a normal vector for each mesh vertex, determining a gradient of the SDF along each normal vector, positioning the plurality of cage vertices on normal vectors, and moving the plurality of cage vertices in directions indicated by the gradients until the value of the SDF reaches a distance parameter.

In some implementations of the method, the 3D mesh is an inner body cage of a body of a 3D avatar, the cage is an outer body cage for the 3D avatar, and generating the 3D object comprises causing the 3D avatar to be displayed according to the inner body cage and the outer body cage.

In some implementations of the method, determining the SDF approximant comprises determining a respective weight for each of the plurality of RBFs, and the SDF approximant comprises a weighted sum of the plurality of RBFs using the respective weights.

In some implementations of the method, determining the respective weight for each plurality of RBFs comprises calculating the weights such that the value of the weighted sum evaluated at each mesh vertex is a common constant.

In some implementations of the method, determining the SDF approximant comprises determining an average magnitude of gradient vectors of the weighted sum evaluated at the mesh vertices, and normalizing the weights according to the average magnitude such that the SDF comprises a sum of the RBFs weighted by the normalized weights.

In some implementations of the method, the 3D mesh is an outer body cage of a body of a 3D avatar, the cage is an outer clothing cage for a piece of clothing for the 3D avatar, and generating the 3D object comprises causing the 3D avatar to be displayed according to the body of the 3D avatar, the piece of clothing, and the outer clothing cage.

In some implementations of the method, determining the SDF proximant comprises determining a respective weight function for each of the plurality of RBFs and the SDF approximant comprises a weighted sum of the plurality of RBFs using the respective weight functions.

In some implementations of the method, determining the weight function for each of the plurality of RBFs comprises calculating the weight functions such that the weighted sum evaluated at respective pairs of points on the normal vectors and centered at the vertices is equal to the signed distance from each point to the respective central vertex.

In some implementations of the method, determining the weight function for each plurality of RBFs comprises calculating the weight functions such that the weighted sum of the plurality of RBFs equals a constraint constant at constraining distances around the 3D mesh, and the constraint constant and constraining distances are greater than a characteristic length of the 3D mesh.

In another aspect, non-transitory computer-readable medium is described. The non-transitory computer-readable medium may have instructions stored thereon that, responsive to execution by a processor, cause the processor to perform or control performance of operations that comprise determining a signed distance function (SDF) approximant for a three-dimensional (3D) mesh by combining a plurality of radial basis functions (RBFs), where the 3D mesh comprises a plurality of vertices and each of the plurality of radial basis functions has an origin on the 3D mesh at a respective mesh vertex; generating a cage for the 3D mesh, the cage comprising a plurality of cage vertices, by determining a normal vector for each mesh vertex, determining a gradient of the SDF along each normal vector, positioning the plurality of cage vertices on normal vectors, and moving the plurality of cage vertices in directions indicated by the gradients until the value of the SDF reaches a distance parameter such that the cage overlays the 3D mesh; and generating a 3D object comprising the 3D mesh and the cage.

In some implementations of the non-transitory computer-readable medium, determining the SDF approximant comprises determining a respective weight for each of the plurality of RBFs such that the value of the weighted sum evaluated at each mesh vertex is a common constant, and the SDF approximant comprises a weighted sum of the plurality of RBFs using the respective weights.

In some implementations of the non-transitory computer-readable medium, the 3D mesh is an inner body cage of a body of a 3D avatar, the cage is an outer body cage for the 3D avatar, and the operation of generating the 3D object further comprises causing the 3D avatar to be displayed according to the inner body cage and the outer body cage.

In some implementations of the non-transitory computer-readable medium, determining the SDF approximant comprises determining a respective weight function for each of the plurality of RBFs such that the weighted sum evaluated at respective pairs of points on the normal vectors and centered at the vertices is equal to the signed distance from each point to the respective central vertex and the SDF approximant comprises a weighted sum of the plurality of RBFs using the respective weight functions.

In some implementations of the non-transitory computer-readable medium, the 3D mesh is an outer body cage of a body of a 3D avatar, the cage is an outer clothing cage for a piece of clothing for the 3D avatar, and the operation of generating the 3D object further comprises causing the 3D avatar to be According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.displayed according to the body of the 3D avatar, the piece of clothing, and the outer clothing cage.

In other aspect, an apparatus is described. The apparatus may comprise a processor; and a non-transitory computer-readable medium coupled to the processor and having instructions stored thereon that, responsive to execution by the processor, cause the processor to perform or control performance of operations that comprise: determining a signed distance function (SDF) approximant for a three-dimensional (3D) mesh by combining a plurality of radial basis functions (RBFs), where the 3D mesh comprises a plurality of vertices and each of the plurality of radial basis functions has an origin on the 3D mesh at a respective mesh vertex; generating a cage for the 3D mesh, the cage comprising a plurality of cage vertices, by determining a normal vector for each mesh vertex, determining a gradient of the SDF along each normal vector, positioning the plurality of cage vertices on normal vectors, and moving the plurality of cage vertices in directions indicated by the gradients until the value of the SDF reaches a distance parameter such that the cage overlays the 3D mesh; and generating a 3D object comprising the 3D mesh and the cage.

In some implementations of the apparatus, determining the SDF approximant comprises determining a respective weight for each of the plurality of RBFs such that the value of the weighted sum evaluated at each mesh vertex is a common constant, and the SDF approximant comprises a weighted sum of the plurality of RBFs using the respective weights.

In some implementations of the apparatus, the 3D mesh is an inner body cage of a body of a 3D avatar, the cage is an outer body cage for the 3D avatar, and the operation of generating the 3D object further comprises causing the 3D avatar to be displayed according to the inner body cage and the outer body cage.

In some implementations of the apparatus, the 3D mesh is an outer body cage of a body of a 3D avatar, the cage is an outer clothing cage for a piece of clothing for the 3D avatar, and determining the SDF approximant comprises determining a respective weight function for each of the plurality of RBFs such that the weighted sum evaluated at respective pairs of points on the normal vectors and centered at the vertices is equal to the signed distance from each point to the respective central vertex and the SDF approximant comprises a weighted sum of the plurality of RBFs using the respective weight functions, and the operation of generating the 3D object further comprises causing the 3D avatar to be displayed according to the body of the 3D avatar, the piece of clothing, and the outer clothing cage.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
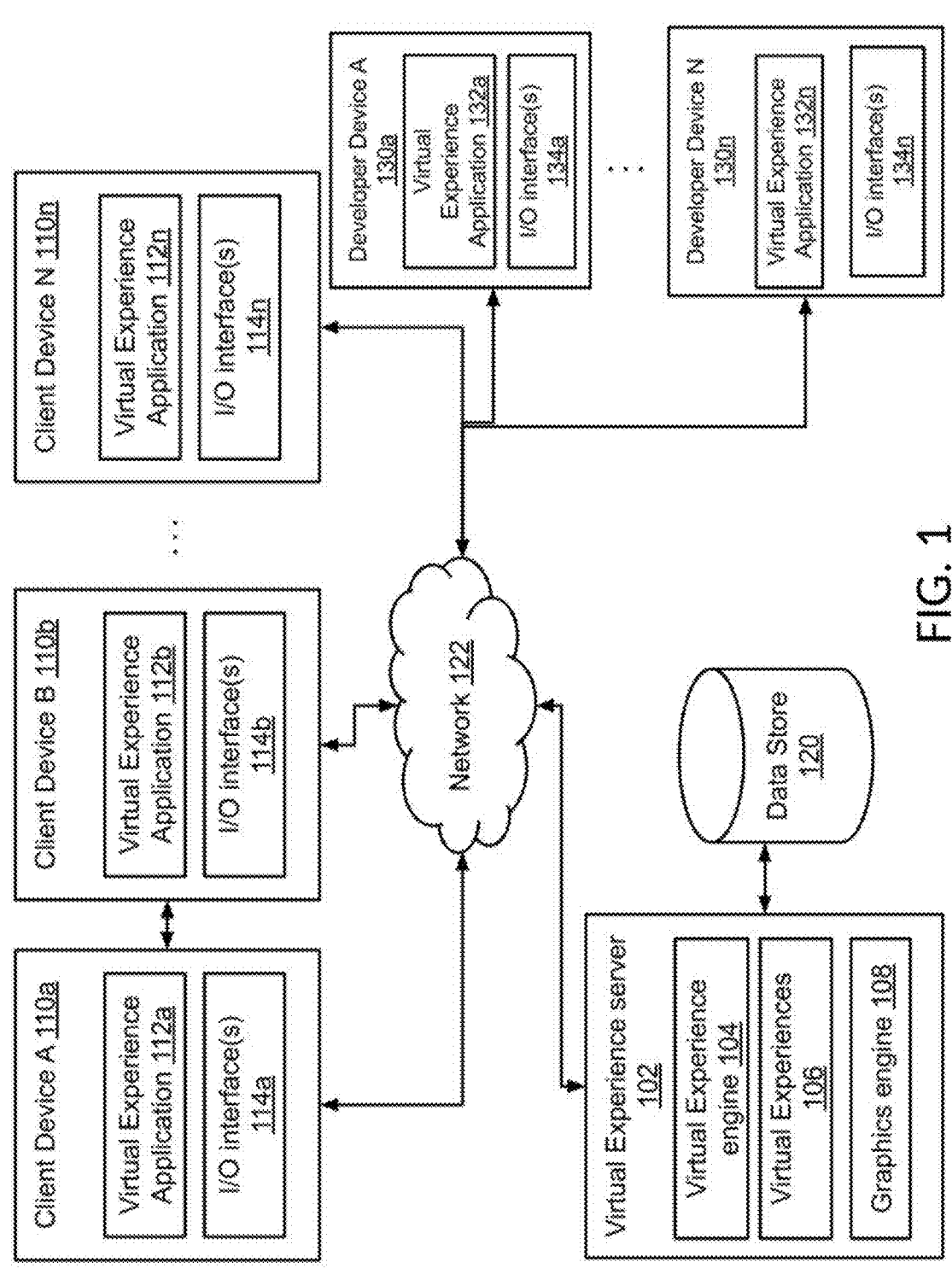
FIG. 1 is a diagram of an example system architecture for simulation of rigid body objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

The present disclosure provides techniques to automatically generate cage meshes for 3D objects such as clothing, bodies, and accessories. These cages may be used to create 3D objects. For example, two identically indexed inner and outer cages may be used to define a layer of 3D vector fields that represent a 3D object. In some cases, the inner cage is a template for the object, which can be customized by a user or can be automatically conformed to an underlying object. For example, the inner cage may be a body mesh that can be customized by a user or content creator; or the inner cage may a template for an article of clothing that will be fitted to an underlying body mesh.

The described technique allows any body geometry to be fitted with any clothing geometry, including enabling layers of clothing to be fitted over underlying layer(s) of clothing, thereby providing customization without the limits imposed by pre-defined geometries or requiring complex computations to make a clothing item compatible with arbitrary body shapes of avatars or other clothing items. The cage-to-cage fitting is also performed algorithmically by a gaming platform or gaming software (or other platform/software that operates to provide a 3D environment), without requiring avatar creators (also referred to as avatar body creators, or body creators) or clothing item creators to perform complex computations. The terms "clothing" or "clothing item" used herein are understood to include clothing and accessories, and any other item that can be placed on an avatar in relation to specific parts of an avatar cage.

The implementations described herein enable the work of the avatar body creators to be decoupled from the work of the clothing creators. For example, avatar body creators can create bodies having geometries of any desired/customized shape and size, and publish the bodies in a body library hosted by a 3D platform. Clothing creators can independently create generic templates of any piece of clothing, such as shirts, pants, etc., and publish the clothing templates in a clothing library hosted by the 3D platform.

Purely for purposes of illustration and explanation, various embodiments are described herein in the context of 3D avatars that are used in a 3D game provided by a gaming platform. It is appreciated that such gaming environments are merely examples. Other implementations of the cage-to-cage layering techniques described herein may be applied to other types of 3D environments, such as a virtual reality (VR) conference, a 3D session (e.g., an online lecture or other type of presentation involving 3D avatars), an augmented reality (AR) session, or in other types of 3D environments that may include one or more users that are represented in the 3D environment by one or more 3D avatars.

At runtime during a game or other 3D session, a player/user accesses the body library to select a particular body, and accesses the clothing library to select pieces of clothing to place on the selected body. The 3D environment platform that presents the avatars then implements the cage-to-cage fitting techniques to adjust (by suitable deformations, determined automatically) a piece of clothing to conform to the shape of the body, thereby automatically fitting the piece of clothing onto the body (and any intermediate layers, if worn by the avatar). The user can further select an additional piece of clothing to fit over an underlying piece of clothing (layered clothing), with the additional piece of clothing deforming to match the geometry of the underlying piece of clothing.

The implementations described herein are based on the concept of "cages" and "meshes." A body mesh is the actual visible geometry of an avatar. A body mesh includes the graphical representation of the arms, legs, torso, head parts, etc. and can be of arbitrary shape, size, and geometric topology. Analogously, a clothing mesh can be any arbitrary mesh that graphically represents a piece of clothing, such as a shirt, pants, hat, shoes, etc. or parts thereof.

In comparison, a cage represents an envelope of features points around the avatar body that is much simpler than the body mesh and has correspondence to the vertices of the body mesh. As will be explained in further detail later below, a cage may also be used to represent not only the set of feature points on an avatar body, but also a set of feature points on a piece of clothing.

FIG. 1 is a diagram of an example system architecture for simulation of rigid body objects, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 6. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual gaming server. For example, the gaming server may provide single-player or multiplayer games to a community of users that may access as "system" herein) includes online gaming server 102, data store 120, client or interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 106 may be collectively referred to as a "world" or "virtual experience world" or "gaming world" or "virtual world" or "universe" herein. An example of a world may be a 3D world of a virtual experience 106. For example, a user may build a virtual environment that is linked to another virtual environment created by another user. A character of the virtual virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110a to client device 110b) participating in the virtual experience 106. The client devices 110 may use the experience instructions and render the virtual experience for presentation on the displays of client devices 110.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110b to client device 110n), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online virtual experience platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 130 by the online virtual experience server 102. In another example, the virtual experience application 132 may be an application that is downloaded from a server. Game application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

FIGS. 2A-2E illustrate an example process of generating a cage 204 from a 3D mesh 201. In this example, the 3D mesh 201 is the leg portion of a 3D body mesh and the cage 204 is the corresponding leg portion of a body cage. The body cage 204 overlays the external surface/contours of the body cage, i.e., the body cage 204 at least partially surrounds or at least partially envelopes the body mesh 201. The body mesh 201 may include multiple polygons and their vertices (not shown). For example, the polygons of the body mesh (as well as those of a clothing mesh) may be triangles, with the surface area of each triangle providing a "face" or "mesh face." In this example, the illustrated body mesh 201 comprises an interpolated surface that provides a smooth contour while comprising the body vertices and the polygons. In practice, a body mesh 201 may comprise hundreds or thousands of body vertices and their corresponding polygons.

The illustrated body cage 204 comprises a plurality of cage vertices 205 connected by cage edges 206 to form triangular cage faces 207. In other examples, the vertices may be connected in other polygonal fashions. The illustrated body cage 204 is an outer body cage with vertices 205 spaced apart from the vertices of the corresponding body mesh 201, which serves as an inner body cage. The spacing is sufficiently small such that a clothing mesh (not shown) co-located with the outer body cage may be perceived as being worn by the avatar with body mesh 201. For example, in a virtual space with described by metric units the cages may be separated by a length between a fraction of a centimeter and several centimeters. For example, the cages may be separated by a length between 0.5 cm to 10 cm. Different types of meshes may be separated by different typical distances. For example, a clothing mesh with a tight-fitting appearance might have an average separation of 0.5 cm, a normal-fitting appearance might have an average separation between 1-2 cm, or a loose-fitting appearance might have an average separation between 3-5 cm. In the illustrated example, the outer cage 204 has the same number of vertices as the corresponding body mesh 201 and the body mesh 201 serves as an inner cage. In other examples, the outer cage and the inner cage may have different numbers of vertices. For example, after positioning the outer cage vertices, as described below, the outer cage may be subject to vertex merging where vertexes within a threshold distance from each other are replaced with a single vertex. Accordingly, an outer cage vertex may correspond to one or more inner cage vertices. Further, the inner cage and outer cage may have different resolutions. For example, the outer cage may have a lower resolution than the inner cage such that the outer cage vertices correspond to a subset of the inner cage vertices. Further, the inner cage may have a lower resolution than the body mesh 201 such that the inner cage vertices correspond to a subset of the body mesh vertices. Transitively, the outer cage vertices may then correspond to a subset of the body mesh vertices or may correspond to a subset of a subset of the body mesh vertices.

As described further below, a signed distance function (SDF) approximant may be used to position the vertexes of a cage. A signed distance function for a 3D object maps points in the virtual space surrounding the object to the distance from the point to the object. An SDF approximant mimics the behavior of an SDF near the 3D object. For example, the output of an SDF approximant for a point may be within 1%-5% of the actual distance for points near the 3D object. For example, in a metric-unit 3D space, the SDF approximant might have a value within 3% of the actual SDF within a range of 1 cm to 5 cm from the surface of the 3D object. More generally, the SDF approximant may exhibit similar behaviors to a true SDF. For example, the SDF approximant is positive for points where the distance to the object is positive (i.e., the point is outside the mesh) and is negative where the distance to the object is negative (i.e., the point is inside the mesh). As another example, the SDF approximant may have gradient directionality similar to the true SDF; in other words, the SDF approximant is increasing where the SDF is increasing and the SDF approximant is decreasing where the SDF is decreasing.

Figures 2A, 2B, 2C, 2D, 2E:
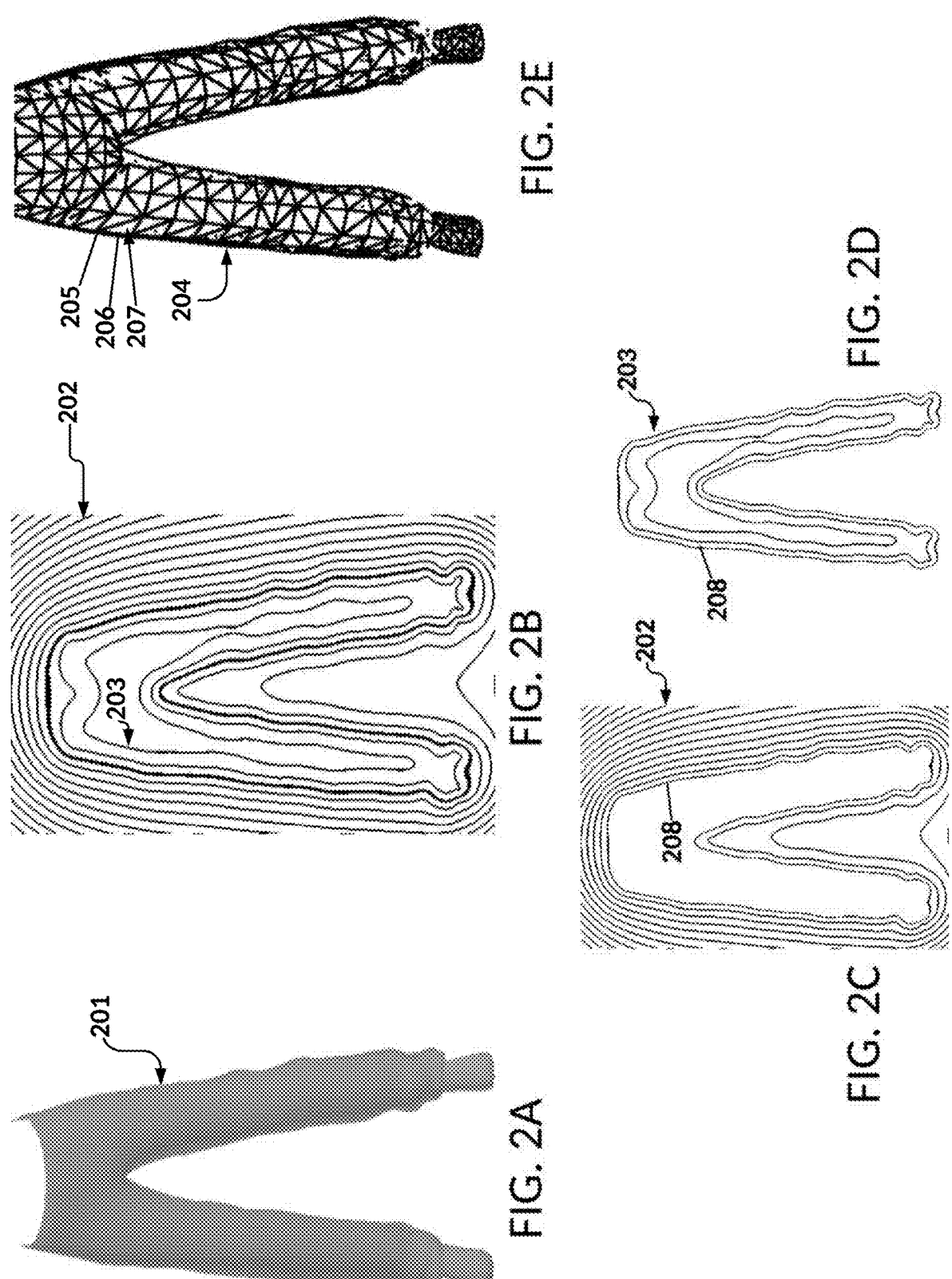
FIGS. 2A-2E illustrate a process of automated cage generation for a 3D mesh, in accordance with some implementations.

FIGS. 2B-2D illustrate the field of an example SDF approximant for the mesh 201. Field 202 (FIG. 2C) illustrates positive valued isosurfaces (i.e., level sets) of the SDF appoximant. In other words, all points on a given line have the same (positive) approximate distance to mesh 201. Field 203 (FIG. 2D) illustrates negative valued isosurfaces. In other words, all points on a given line have the same (negative) approximate distance to mesh 201. Contour line 208 illustrates the zero valued isosurface. In some examples, the vertices 205 of the outer cage are positioned in the positive field 202 near the zero-level isosurface 208. For example, the outer cage may be positioned at average separations as described above with respect to clothing meshes. For example, the outer cage may be positioned at a range from 0.5 cm to 2 cm depending on a desired appearance, such as a tight-fitting or normal-fitting appearance. As another example, for loose-fitting clothing or larger clothing, such as clothing mimicking a winter coat, the separation may be 5 cm or more. As described in more detail below, the inner cage may be positioned according to the SDF approximant. For example, the inner cage vertices may be located on the zero-level isosurface 208.

Figure 3:
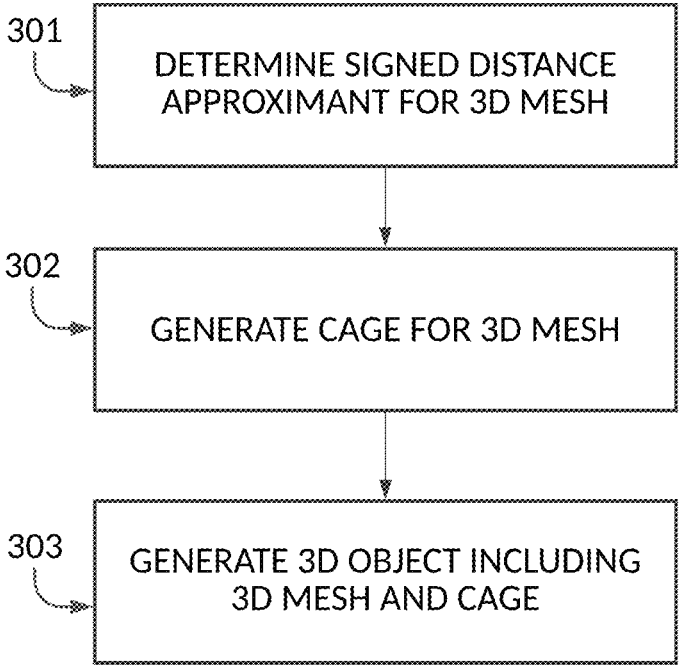
FIG. 3 illustrates a method of 3D object generation using a cage and a 3D mesh, in accordance with some implementations.

FIG. 3 is a block diagram illustrating an example method for generating a 3D object including a cage and a mesh using an SDF approximant. For example, the illustrated method may be used to generate a 3D avatar having a body cage, an article of clothing or other accessory for a 3D avatar, or combinations thereof.

Block 301 includes determining the SDF approximant for a 3D mesh. The SDF approximant may be determined by combining a plurality of radial basis functions (RBFs). As used herein, an RBF is a real valued function whose output depends on the distance between a point and a fixed point, where the fixed point is referred to as the "origin" for the RBF. In this description, the distance is generally the Euclidean distance, represented by $|x-o|$ where x is the free variable and o is the origin. Other implementations may utilize other distance metrics, such as the Manhattan distance (i.e., the $L_1$-norm), the sum of squared difference norm (i.e., the squared $L_2$-norm), or other p-norm, for example.

In the example method, each RBF has an origin on the 3D mesh. For example, the origins may be located at mesh vertices. An RBF of this type is denoted $|x-v_i|$, where $v_i$ is a vertex of the mesh and x is the point to which the distance is evaluated. In other implementations, the origins may be located at other mesh positions such as face or edge centers, or may be located at a combination of different types of mesh elements. As an example, discussed further below, the RBFs may be combined as a weighted sum:

$$\sum_i^N w_i |x - v_i|$$

where i indexes the N vertices that are summed over and $w_i$ is the weight corresponding to the vertex $v_i$. In some examples, N may be total number of vertices of the 3D mesh such that each vertex of the mesh has an associated RBF $|x-v_i|$ and an associated weight $w_i$. In other examples, N may be a subset of the vertices. For example, the N vertices may be selected randomly or by a modulo on the vertex indices (e.g., every second, third, or nth vertex may be selected). As another example, every vertex in lower resolution portions of the mesh could be selected while a subset of the vertices in a higher resolution portion of the mesh could be selected. As described further below, the weights $w_i$ may be numbers or may be functions, such as functions of position. In some examples and as discussed further below, the SDF may further comprise various parameters or functions. For example, the SDF may have the form:

$$SDF(x) = \left( \sum_{i}^{N} w_i |x - v_i| - c \right)$$

where c is a constant.

Block 302 includes generating a cage for the 3D mesh such that the cage overlays (i.e., surrounds or partially surrounds) the 3D mesh. As described above, the cage comprises a plurality of cage vertices. In some examples, the number of cage vertices is equal to the number of mesh vertices. For instance, the cage vertices may be created by duplicating the mesh vertices. As another example, the cage vertices may have a lower resolution than the mesh vertices. For instance, the cage vertices may be created by sampling the mesh vertices and duplicating the sampled mesh vertices.

Figure 4:
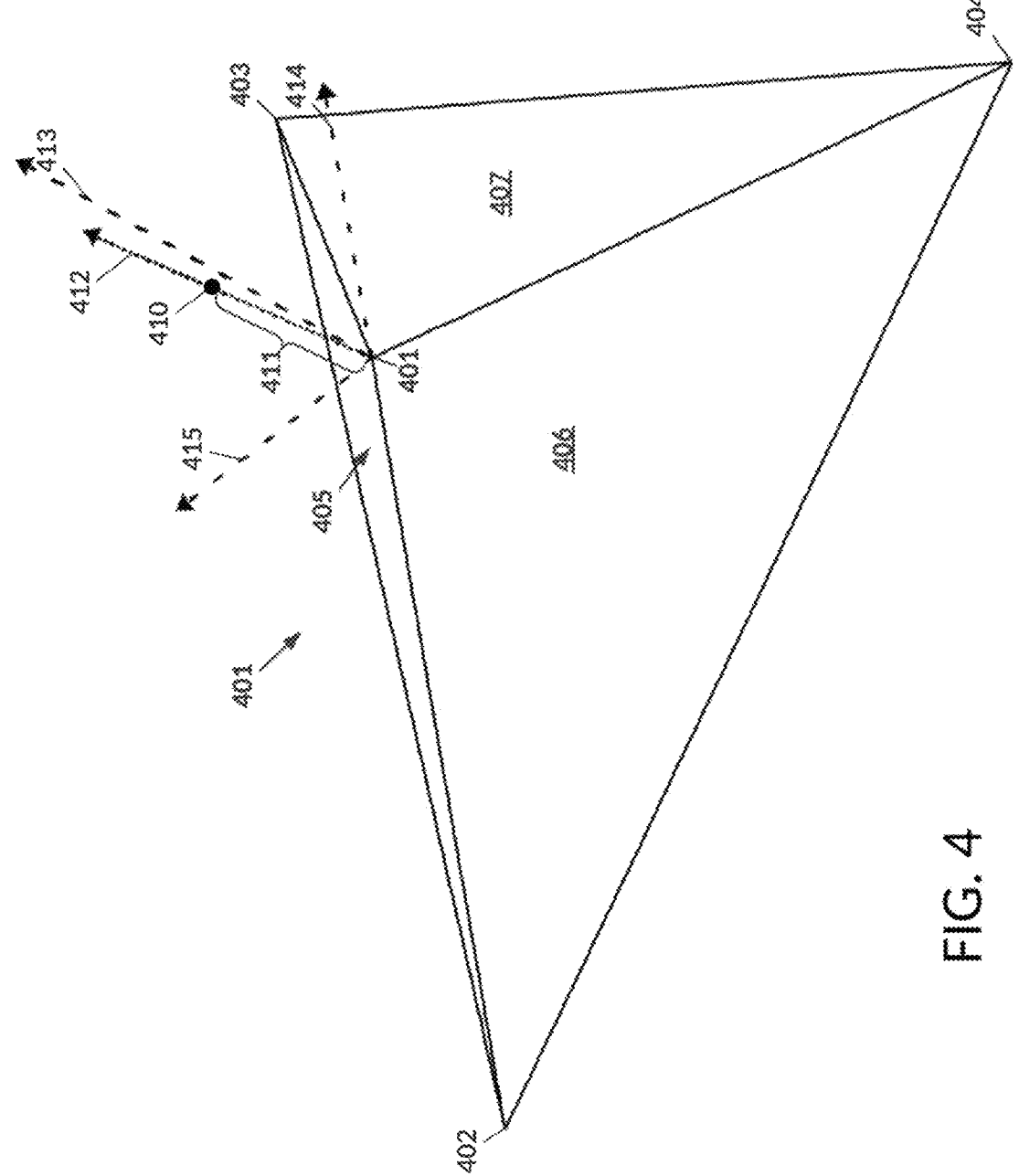
FIG. 4 illustrates aspects of cage generation involving normal vectors at mesh vertices, in accordance with some implementations.

Block 302 includes positioning the cage vertices using the SDF approximant. For example, block 302 may comprise positioning the cage vertices on an isosurface of the SDF. In some examples, the cage vertices are positioned on normal vectors of their corresponding mesh vertices. Block 302 is further described with reference to FIG. 4 for ease of explanation. FIG. 4 illustrates an example of positioning for a cage vertex 410. FIG. 4 illustrates a portion 401 of a 3D mesh comprising four vertices 401, 402, 403, and 404. These four vertices form three triangular faces 405, 406, and 407.

In some examples, block 302 may include determining a normal vector for each mesh vertex. In FIG. 4, normal vector 412 corresponds to mesh vertex 401. Normal 412 extends in both a positive direction (illustrated) out of the mesh and a negative direction (not illustrated) into the mesh. In some examples, block 302 may include determining the normal vector for each mesh vertex by averaging the normal vectors of the faces to which the vertex is connected. In FIG. 4, vertex 401 is connected to faces 405, 406, and 407, which have normals 415, 413, and 414, respectively. The normals are illustrated as originating at point 401. In practice, normals provide a direction that is orthogonal to their respective face, such that face normal vectors may originate at arbitrary positions. For example, the normal vector for face 407 at vertex 404 would be parallel to normal 413. The normal vector 412 for mesh vertex 401 is the average of normal vectors 413, 414, and 415. In other implementations, a greater or fewer number of face normals may be averaged to determine the vertex normals. For example, for a mesh that is subdivided into quadrilateral faces, four normals would be averaged to determine the vertex normals.

Block 302 further comprises positioning the cage vertices on the corresponding mesh vertex normals using the SDF approximant. For example, the gradient of the SDF approximant may be calculated along the vertex normals. The gradient may be calculated using finite difference methods applied to the SDF approximant for points on the vertex normals, using automatic differentiation methods applied to the SDF approximant for the vertex normal line, or using any other gradient calculation technique. The vertex gradients may be used to provide a directionality for the positioning of the cage vertices. For example, a cage vertex may initially be positioned at some location on the vertex normal. The sign of the SDF approximant may be evaluated to determine if the initial location is inside or outside the 3D mesh, and the gradient of the SDF approximant provides a direction to move the cage vertex towards the desired location. For example, the final location may be determined when the value of the SDF approximant reaches a distance parameter. For example, the cage vertex 410 is positioned at a distance 411 from its corresponding mesh vertex 401. As described above, the SDF approximant approximates a true SDF. Accordingly, the value of the SDF approximant at point 410 may differ from the actual illustrated distance 411. In some examples, the difference between the SDF approximant and a true SDF may depend on the distance from the origin vector. For example, as described above, the SDF approximant may be between 1%-5% (such as 3%) of the true distance at points close to the surface of the mesh (such as 1-5 cm from the mesh), while the SDF approximant may differ by 15% or more at points more distant from the mesh (such as 10 cm or more from the body mesh).

Block 303 comprises generating a 3D object that includes the 3D mesh and the cage. For example, block 303 may include instantiating a 3D object as an avatar body, item of avatar clothing, or accessory for an avatar, as described above with respect to FIG. 1. Block 303 may further include causing the 3D object to be displayed. For example, the 3D objected may be displayed as an aspect of participation in a virtual world as described above.

For example, the 3D mesh may be an inner body cage of a body of a 3D avatar, and the cage may be an outer body cage for the 3D avatar. Block 303 may then include causing the 3D avatar to be displayed. For example, the 3D avatar may be displayed for customization of the avatar's clothing. In this example, the selected clothing may include mesh vertices that are located on the outer cage. As a further example, the 3D avatar may be displayed for participation in a virtual world as described above. In some examples, the outer body cage may serve as a simulated outer surface for simulated physical interactions (e.g., the outer body cage may serve as a "hit box").

As another example, the 3D mesh may be an outer body cage of a body of a 3D avatar and the cage may be an outer clothing cage for a piece of clothing for the 3D avatar. In this example, generating the 3D object may include instantiating the 3D mesh and cages and causing the 3D avatar to be displayed according to the body of the 3D avatar, the piece of clothing, and the outer clothing cage. For example, the inner cage of an article of clothing may be located at an outer body cage. In these examples, the outer cage of the body may also be generated according to the method of FIG. 3 or the outer cage of the body may be generated according to other cage generation methods. In some examples, the method may be used to generate multiple layers of clothing. For example, the cage may comprise an outer clothing cage for the second article of clothing and the 3D mesh may comprise a first outer clothing layer of a first article of clothing or a second inner clothing cage located at the first outer clothing cage.

Figure 5:
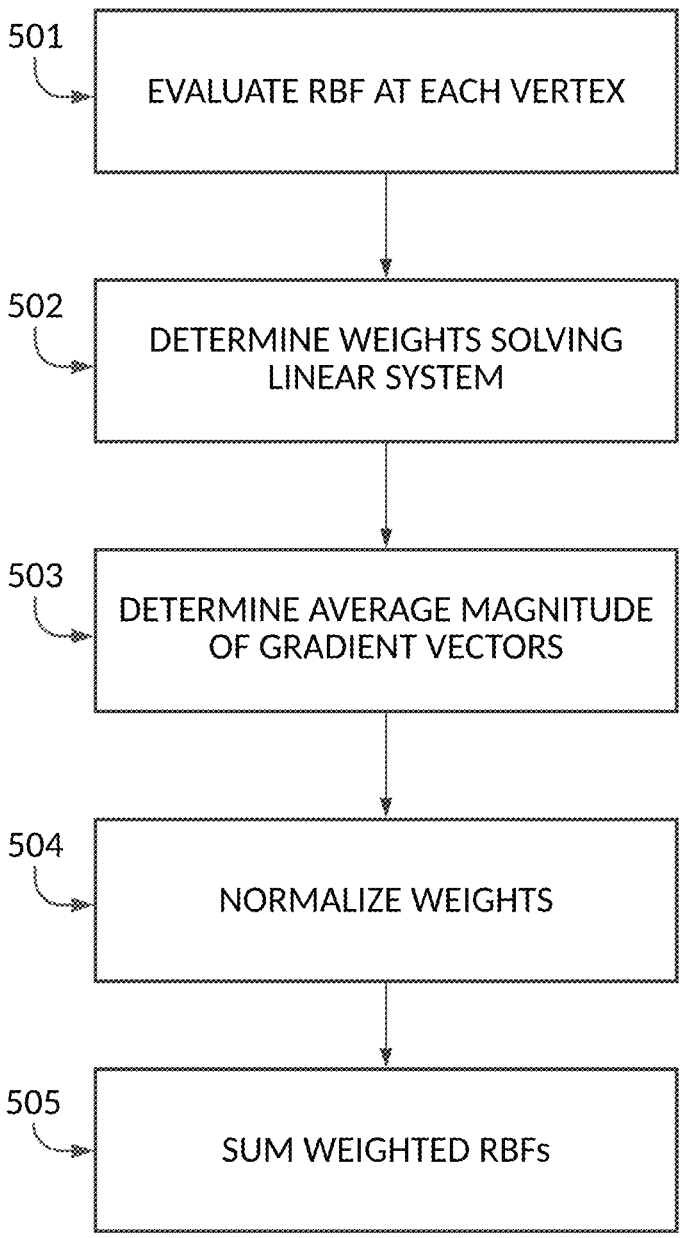
FIG. 5 illustrates a method of generating a signed distance function (SDF) approximant, in accordance with some implementations.

As discussed with respect to block 301 of FIG. 3, determining an SDF approximant for a mesh may include determining weights for a plurality of RBFs and forming a weighted sum of such RBFs using the weights. FIG. 5 illustrates an example method of determining weights and forming a weighted sum. For example, the method of FIG. 5 may be implemented for generating a body cage for a body mesh or may be implemented for generating a clothing cage for a clothing mesh. To assist in explanation, FIG. 5 will be described with reference to FIGS. 6A and 6B, which illustrate an example mesh wire frame (i.e., with faces unillustrated) and lines representing the RBFs evaluated for an example vertex at every other mesh vertex.

Figure 6B:
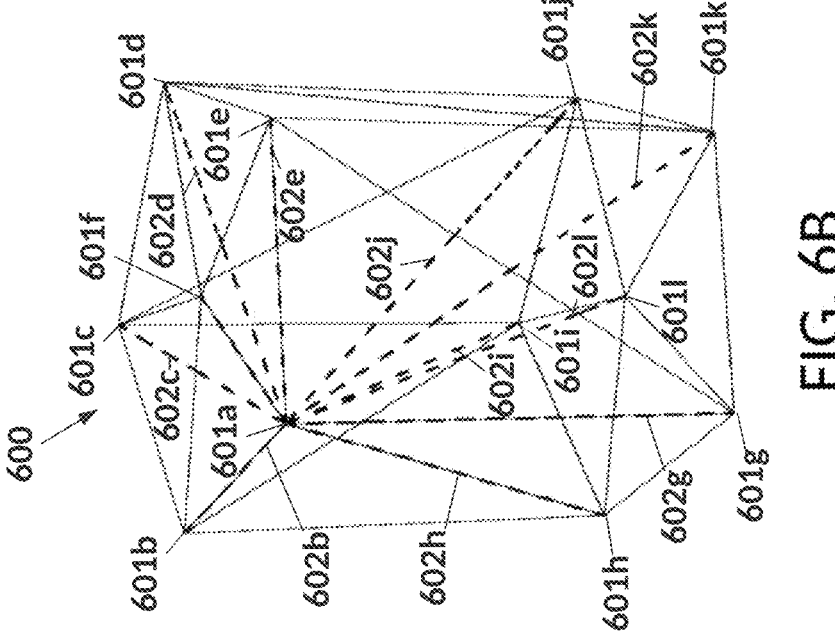
FIGS. 6A-6B illustrate an example mesh for description of aspects of FIG. 5, in accordance with some implementations.
Figure 6A:
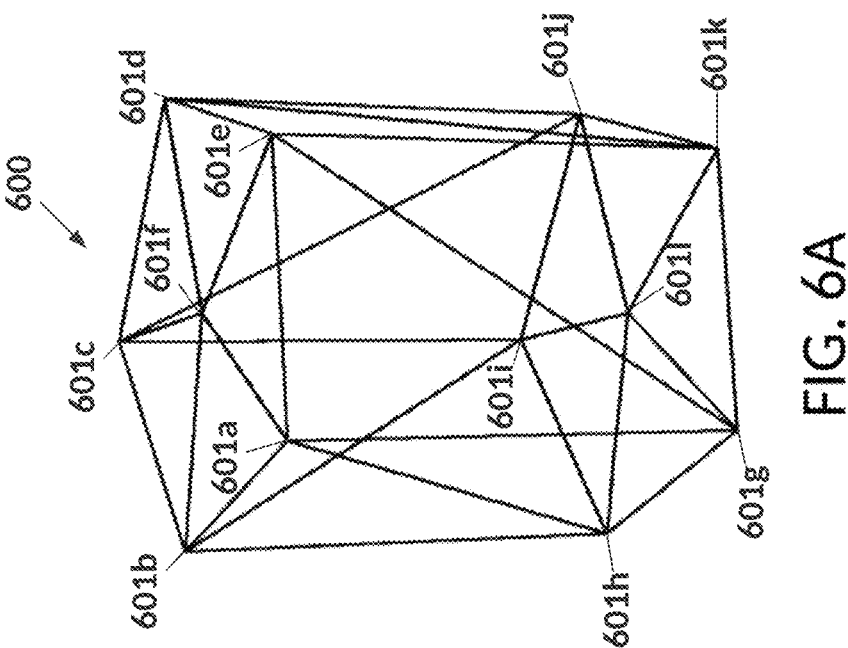

Block 501 includes evaluating the RBFs centered at each vertex at each other vertex. In other words, block 501 includes evaluating $RBF(v_i-v_j)$ for all vertexes i,j within the mesh. For example, FIGS. 6A-B include mesh 600 having vertices 601$a$-601$l$. Block 501 includes evaluating the RBF between every pair of points. FIG. 6B illustrates lines segments 602$_b$-602$_l$ originating from vertex 601$_a$. For example, if the RBF is the Euclidean or absolute distance $RBF(x)=|x|$, then the $RBF(v_i-v_j)$ for $v_j$=601$a$ and for all other $v_i$ is the length of the corresponding line segment.

Block 502 includes determining weights for the RBFs by solving a linear system of equations. In this example, the linear system can be written as:

$$b(v_i) = \sum_j w_i RBF(v_i - v_j),$$

where i,j index over the vertices to be used for cage generation, $w_i$ are the weights and $b(v_i)$ are parameters representing properties or values configured according to the desired behavior of the SDF. When the RBF is the absolute distance, this may be written as:

$$b(v_i) = \sum_j w_i |v_i - v_j|.$$

In matrix notation, this may be written as:

$$b = Aw,$$

where A is a matrix where $A_{ij}=RBF(v_i-v_j)$ (for example, $A_{ij}=|v_i-v_j|$), w is a column vector of weights $[w_i]$ and b is a column vector of parameters $[b_i]$ where $b_i=b(v_i)$. Solving this matrix for w may be performed by multiplying b by the inverse of A:

$$A^{-1}b = w.$$

In this example, the matrix is symmetric and has a size is equal to the number of cage vertices. The solution to this system may be determined according to various automated linear algebra solving routines. Such methods for matrices the size of the number of vertices are typically very computationally inexpensive, such that they may be quickly performed for one or a large number of meshes by user devices or application servers. In some examples, the parameter is selected such that the sum of the RBFs at each mesh vertex is a common constant. In other words, the system to be solved may be written as:

$$b(v_i) = c = \sum_j w_i RBF(v_i - v_j).$$

This may be implemented by setting the column vector b to be [c] (i.e., b is a column vector consisting of the constant c repeated for the number of cage vertices). In one example, c=1 and the weights are determined by solving Aw=[1]. In these examples, the constant may be subtracted from the weighted sum to generate the SDF approximate. Accordingly, the SDF approximant may be written as:

$$SDF(x) = \left( \sum_i w_i |x - v_i| - c, \right)$$

and in the particular example where c=1:

$$SDF(x) = \left( \sum_i w_i |x - v_i| - 1. \right)$$

Figures 7A, 7B:
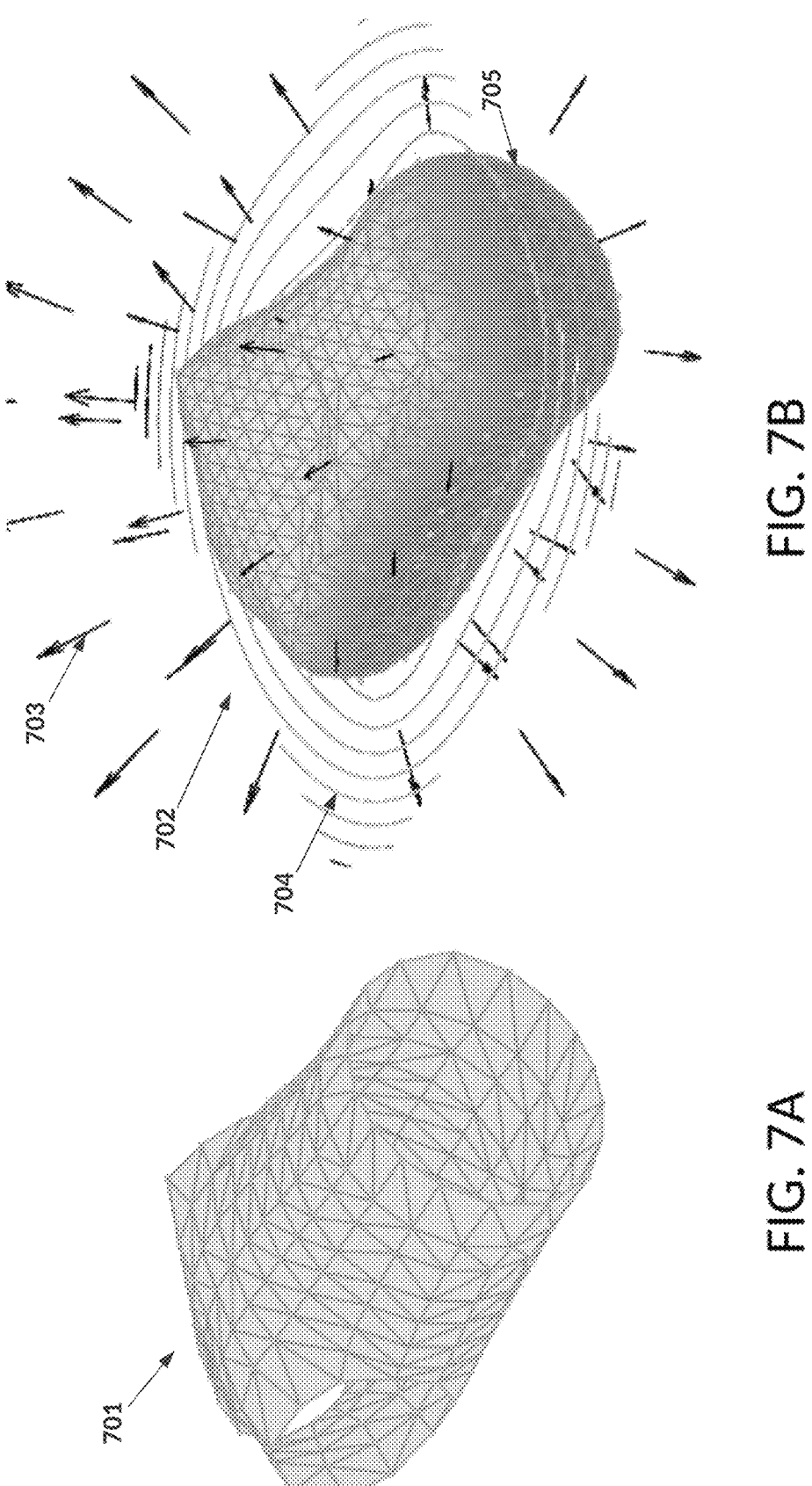
FIGS. 7A-7B illustrate an example mesh and aspects of a resultant SDF approximant as described with respect to FIG. 5, in accordance with some implementations.

FIGS. 7A-7B illustrate the application of this SDF approximant to a 3D torso mesh 701. FIG. 7A illustrates the original 3D mesh 701. FIG. 7B illustrates various aspects 702 of the SDF approximant for mesh 701, including gradient vectors 703 at various locations arrows 703, contour lines 704 for a slice of the SDF on the xy plane, and the zero level isosurface 705. As illustrated, the gradient vectors 703 at points outside the mesh point outwards, the contour lines 704 surround the mesh 701 and have a smooth profile that reflects increasing distance from the mesh, and the zero level isosurface 705 closely matches the mesh 701.

In some examples, it may be beneficial to adjust the SDF approximant to control the magnitude of the gradient field near the 3D mesh. For example, this may assist with gradient walking techniques for cage vertex placement as described above with respect to block 302 of FIG. 3. Block 503 and 504 illustrate operations to provide normalized gradients. Block 503 includes determining the magnitudes of the gradients (i.e., slopes of the SDF approximant) at the mesh vertices corresponding to the cage being generated. Block 503 further includes averaging these magnitudes to determine an average gradient magnitude for the set of mesh vertices. Block 504 includes normalizing the weights $w_i$ determined in step 502 according to the average gradient magnitude to generate normalized weights $w'_i$.

In these examples, block 505 is performed to generate the final SDF approximant to be used in cage generation. Block 505 includes generating the SDF approximant as a weighted sum of the RBFs using the normalized weights. Accordingly, in the example of c=1:

$$SDF(x) = \left( \sum_i^N w'_i |x - v_i| - 1. \right)$$

Figure 8:
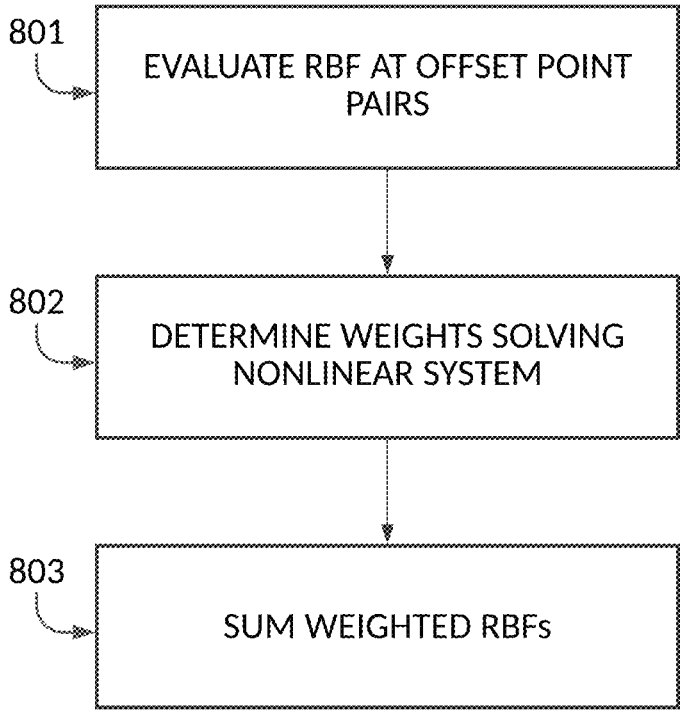
FIG. 8 illustrates a method of generating a signed distance function (SDF) approximant, in accordance with some implementations.

As discussed with respect to block 301 of FIG. 3, determining an SDF approximant for a mesh may include determining weights for a plurality of RBFs and forming a weighted sum of such RBFs using the weights. FIG. 8 illustrates a method of determining weights for the SDF using the normal vectors of the mesh vertices. Compared to the weight determination method of FIG. 5, this method may result in an SDF approximant with more fidelity to the gradient of a true SDF. Accordingly, this method may be useful in clothing cage determination, but may also be used in body cage generation.

Figure 9:
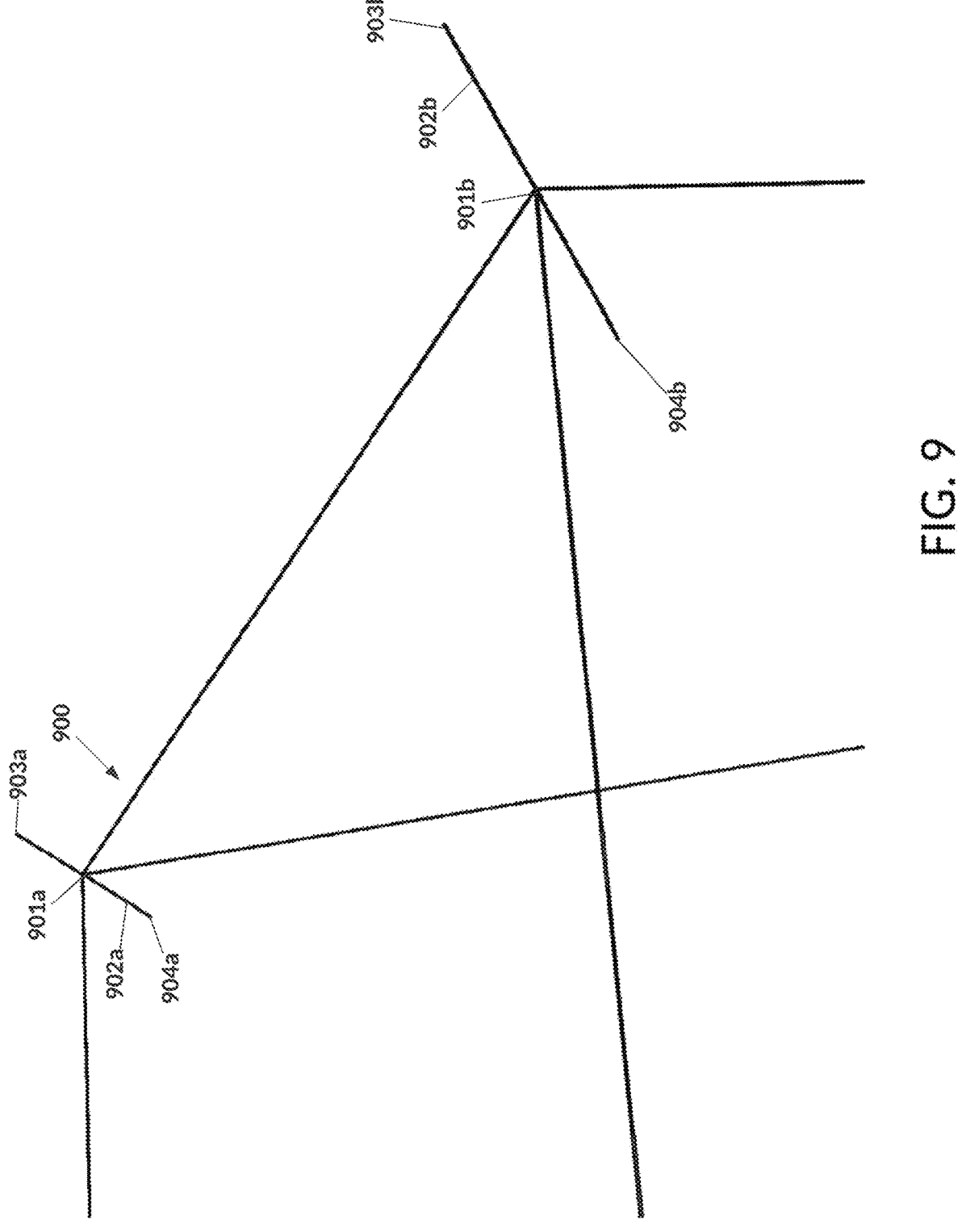
FIG. 9 illustrates a portion of an example mesh to illustrate aspects of the method described with respect to FIG. 8, in accordance with some implementations.

In block 801, the RBFs for each vertex are evaluated at a pair of offset points located on the vertex normals. FIG. 9 illustrates a portion 900 of an example mesh with vertices 901a, 901b, vertex normals 902a, 902b, and point pairs 903a, 904a, and 903b, 904b. Each of the points are offset an equal absolute distance from their respective vertices. One point 903a, 903b is located at a positive offset distance (i.e., an offset distance in the positive normal direction) and the other point 904a, 904b is located at a negative offset distance (i.e., an offset distance in the negative normal direction). The respective vertices 901a, 901b, are located in the center of the normal line connecting the pairs of points. In the described example, the absolute offset distance e is the same for each vertex in the mesh. In other examples, different offset distances may be used for different vertices. In some examples, e may be defined according to a desired spacing between meshes. For example, e may be set according to a desired spacing between a body mesh and a clothing mesh, as discussed above (e.g., between 0.5 cm and 5 cm, depending on desired appearance). The RBF for each vertex is evaluated at each point of the point pairs. In other words $RBF(v_i-eN-v_j)$ and $RBF(v_i+eN+v_j)$ is evaluated for all vertices i and j. Lines 905a-d illustrate $|v_i-eN-v_j|$, $|v_i+eN-v_j|$ for the illustrated vertices and point pairs.

Block 802 includes solving the nonlinear system resulting from setting the weighted sum at the respective pairs of points on the normal vectors to be equal to the signed distance from each point to its respective vertex. In the illustrated example, where each point is offset the same absolute distance, this nonlinear system may be written as:

$$+e = \sum_j w_i RBF(v_i + eN - v_j), \text{ and } -e = \sum_j w_i RBF(v_i - eN - v_j),$$

where i and j index over the cage vertices. Here, due to the nonlinearity of the system, the weights may be functions of position rather than constants.

Solving this system may be performed using various automatic nonlinear solving techniques. Compared to the method of FIG. 5, this system requires solving for twice as many terms (i.e., the corresponding matrix size is twice that of FIG. 5). However, the solution provides a unitary gradient along the normals in the vicinity of the vertices because the method enforces a slope of 1 for the line segment between the two offset points.

In some examples, it may be desirable for the SDF approximant to have a more accurate gradient at longer distances from the mesh. In these examples, block 802 may include providing additional constraints to the system. For example, with a small offset e, the magnitude of the gradient may increasingly deviate from the true SDF at increasing distance from the mesh. In these examples, block 802 may include calculating the weight functions such that the weighted sum of the plurality of RBFs equals a constraint constant at constraining distances around the 3D mesh. For example, a cube of points {(L,L,L), (−L,L,L), (L,−L,L), (−L,−L,L), (L,L,−L), (−L,L,−L), (L,−L,−L), (−L,−L,−L)} may be selected where L is the constraint constant. In this example, an additional 8 equations are added to the system:

$$|L| = \sum_i^N w_i RBF(x - v_i)$$

for x in the set {(L,L,L), (−L,L,L), (L,−L,L), (−L,−L,L), (L,L,−L), (−L,L,−L), (L,−L,−L), (−L,−L,−L)}. In other examples, other constraining volumes may be selected and different constraint constants may be used for different elements of the additional constraint equations. In typical examples, the constraint constant is longer than the characteristic distance of the mesh (i.e., the length of the longest side of a bounding box containing the mesh). As an example, the constraint constant L may be set to be 10%-50% longer than the characteristic distance (e.g., L between $1.1*B_L$ and $1.5*B_L$ where $B_L$ is the longest length of a bounding box containing a body mesh).

In these examples, block 803 is performed to generate the final SDF approximant to be used in cage generation. Block 505 includes generating the SDF approximant as a weighted sum of the RBFs using the weight functions determined in block 802.

Figure 10:
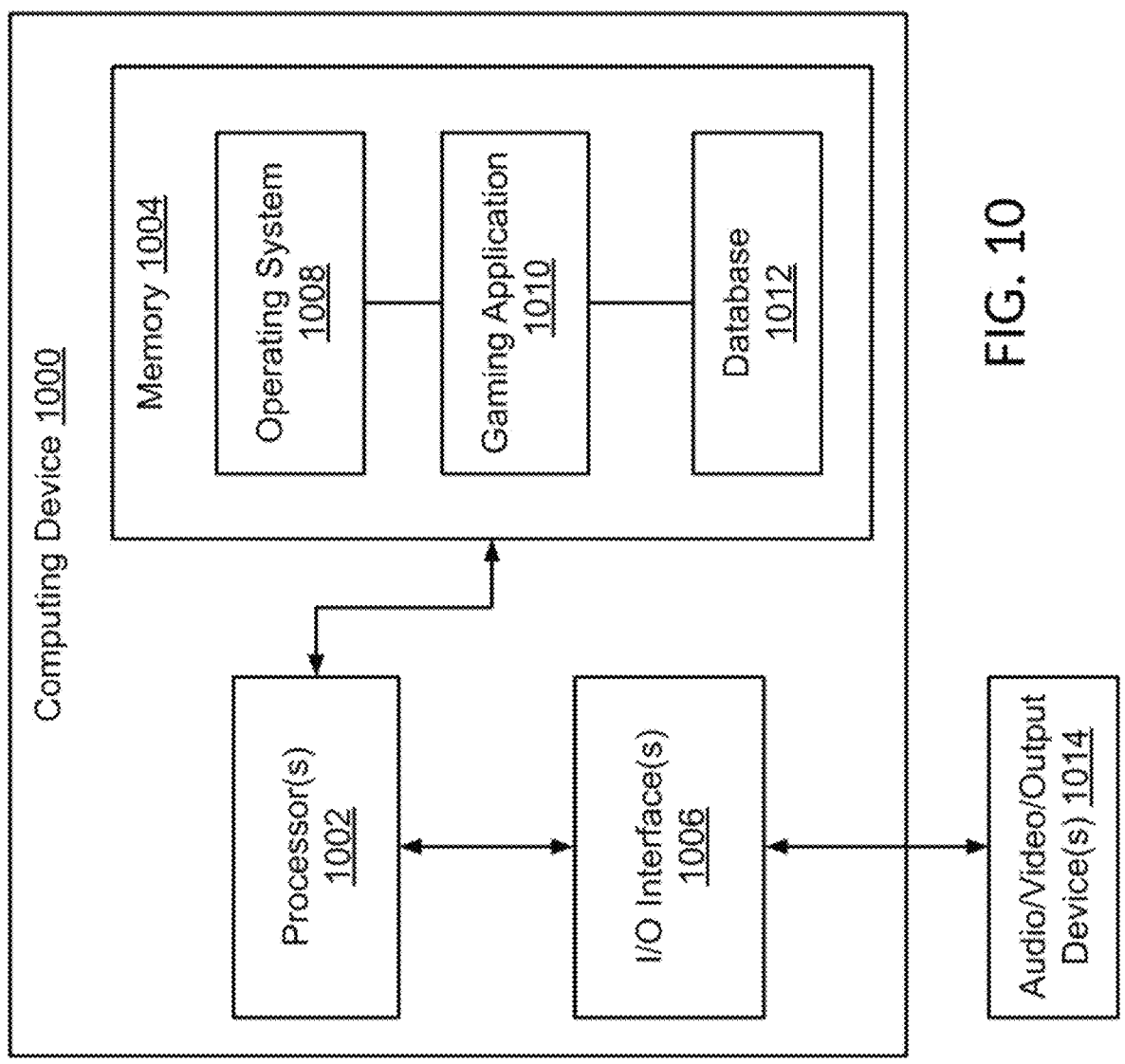
FIG. 10 is a block diagram that illustrates an example computing device, in accordance with some implementations.

FIG. 10 is a block diagram of an example computing device 1000 which may be used to implement one or more features described herein. In one example, device 1000 may be used to implement a computer device (e.g. 102 and/or 110 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008, one or more applications 1010, e.g., an audio spatialization application and application data 1012. In some implementations, application 1010 can include instructions that enable processor 1002 to perform the functions (or control the functions of) described herein, e.g., some or all of the methods described with respect to FIGS. 3, 5, and 8.

For example, applications 1010 can include an audio spatialization module 1012, which as described herein can provide audio spatialization within an online virtual experience server (e.g., 102). Elements of software in memory 1004 can alternatively be stored on any other suitable storage location or computer-readable medium. In addition, memory 1004 (and/or other connected storage device(s)) can store instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or data store 120), and input/output devices can communicate via interface 1006. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1014 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block for each of processor 1002, memory 1004, I/O interface 1006, and software blocks of operating system 1008 and virtual experience application 1010. These blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1004, and I/O interface 1006. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1014, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., FIGS. 3, 5, 8) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:
1. A method, comprising:
determining a signed distance function (SDF) approximant for a three-dimensional (3D) mesh by combining a plurality of radial basis functions (RBFs), where each of the plurality of radial basis functions has an origin on the 3D mesh and wherein the 3D mesh comprises a plurality of mesh vertices and the origin for each RBF is located at a respective mesh vertex;

generating a cage for the 3D mesh, the cage comprising a plurality of cage vertices, by positioning the plurality of cage vertices using the SDF approximant such that the cage overlays the 3D mesh, wherein generating the cage for the 3D mesh comprises:

determining a normal vector for each mesh vertex, determining a gradient of the SDF along each normal vector, positioning the plurality of cage vertices on the normal vectors, and moving the plurality of cage vertices in directions indicated by the gradients until a value of the SDF reaches a distance parameter; and generating a 3D object comprising the 3D mesh and the cage.

2. The method of claim 1, wherein the 3D mesh is an inner body cage of a body of a 3D avatar, the cage is an outer body cage for the 3D avatar, and generating the 3D object comprises causing the 3D avatar to be displayed according to the inner body cage and the outer body cage.

3. The method of claim 2, wherein determining the SDF approximant comprises determining a respective weight for each of the plurality of RBFs, and wherein the SDF approximant comprises a weighted sum of the plurality of RBFs using the respective weights.

4. The method of claim 3, wherein determining the respective weight for each of the plurality of RBFs comprises calculating the weights such that the value of the weighted sum evaluated at each mesh vertex is a common constant.

5. The method of claim 3, wherein determining the SDF approximant further comprises determining an average magnitude of gradient vectors of the weighted sum evaluated at the mesh vertices, and normalizing the weights according to the average magnitude such that the SDF comprises a sum of the RBFs weighted by the normalized weights.

6. The method of claim 1, wherein the 3D mesh is an outer body cage of a body of a 3D avatar, the cage is an outer clothing cage for a piece of clothing for the 3D avatar, and generating the 3D object comprises causing the 3D avatar to be displayed according to the body of the 3D avatar, the piece of clothing, and the outer clothing cage.

7. The method of claim 6, wherein determining the SDF approximant comprises determining a respective weight function for each of the plurality of RBFs and the SDF approximant comprises a weighted sum of the plurality of RBFs using the respective weight functions.

8. The method of claim 7, wherein determining the weight function for each of the plurality of RBFs comprises calculating the weight functions such that the weighted sum evaluated at respective pairs of points on the normal vectors and centered at the vertices is equal to a signed distance from each point to a respective central vertex.

9. The method of claim 8, wherein determining the weight function for each of the plurality of RBFs further comprises calculating the weight functions such that the weighted sum of the plurality of RBFs equals a constraint constant at constraining distances around the 3D mesh, wherein the constraint constant and the constraining distances are greater than a characteristic length of the 3D mesh.

10. A non-transitory computer-readable medium having instructions stored thereon that, responsive to execution by a processor, cause the processor to perform or control performance of operations that comprise:

determining a signed distance function (SDF) approximant for a three-dimensional (3D) mesh by combining a plurality of radial basis functions (RBFs), where the 3D mesh comprises a plurality of vertices and each of the plurality of radial basis functions has an origin on the 3D mesh at a respective mesh vertex;

generating a cage for the 3D mesh, the cage comprising a plurality of cage vertices, by determining a normal vector for each mesh vertex, determining a gradient of the SDF along each normal vector, positioning the plurality of cage vertices on the normal vectors, and moving the plurality of cage vertices in directions indicated by the gradients until a value of the SDF reaches a distance parameter such that the cage overlays the 3D mesh; and generating a 3D object comprising the 3D mesh and the cage.

11. The non-transitory computer-readable medium of claim 10, wherein determining the SDF approximant comprises determining a respective weight for each of the plurality of RBFs such that the value of the weighted sum evaluated at each mesh vertex is a common constant, and wherein the SDF approximant comprises a weighted sum of the plurality of RBFs using the respective weights.

12. The non-transitory computer-readable medium of claim 11, wherein the 3D mesh is an inner body cage of a body of a 3D avatar, the cage is an outer body cage for the 3D avatar, and the operation of generating the 3D object further comprises causing the 3D avatar to be displayed according to the inner body cage and the outer body cage.

13. The non-transitory computer-readable medium of claim 10, wherein determining the SDF approximant comprises determining a respective weight function for each of the plurality of RBFs such that the weighted sum evaluated at respective pairs of points on the normal vectors and centered at the vertices is equal to the signed distance from each point to a respective central vertex and wherein the SDF approximant comprises a weighted sum of the plurality of RBFs using the respective weight functions.

14. The non-transitory computer-readable medium of claim 13, wherein the 3D mesh is an outer body cage of a body of a 3D avatar, the cage is an outer clothing cage for a piece of clothing for the 3D avatar, and the operation of generating the 3D object further comprises causing the 3D avatar to be displayed according to the body of the 3D avatar, the piece of clothing, and the outer clothing cage.

15. An apparatus, comprising:

a processor; and a non-transitory computer-readable medium coupled to the processor and having instructions stored thereon that, responsive to execution by the processor, cause the processor to perform or control performance of operations that comprise:

determining a signed distance function (SDF) approximant for a three-dimensional (3D) mesh by combining a plurality of radial basis functions (RBFs), where the 3D mesh comprises a plurality of vertices and each of the plurality of radial basis functions has an origin on the 3D mesh at a respective mesh vertex;

generating a cage for the 3D mesh, the cage comprising a plurality of cage vertices, by determining a normal vector for each mesh vertex, determining a gradient of the SDF along each normal vector, positioning the plurality of cage vertices on the normal vectors, and moving the plurality of cage vertices in directions indicated by the gradients until a value of the SDF reaches a distance parameter such that the cage overlays the 3D mesh; and generating a 3D object comprising the 3D mesh and the cage.

16. The apparatus of claim 15, wherein determining the SDF approximant comprises determining a respective weight for each of the plurality of RBFs such that the value of the weighted sum evaluated at each mesh vertex is a common constant, and wherein the SDF approximant comprises a weighted sum of the plurality of RBFs using the respective weights.

17. The apparatus of claim 16, wherein the 3D mesh is an inner body cage of a body of a 3D avatar, the cage is an outer body cage for the 3D avatar, and the operation of generating the 3D object further comprises causing the 3D avatar to be displayed according to the inner body cage and the outer body cage.

18. The apparatus of claim 15, wherein the 3D mesh is an outer body cage of a body of a 3D avatar, the cage is an outer clothing cage for a piece of clothing for the 3D avatar, and determining the SDF approximant comprises determining a respective weight function for each of the plurality of RBFs such that the weighted sum evaluated at respective pairs of points on the normal vectors and centered at the vertices is equal to the signed distance from each point to a respective central vertex and wherein the SDF approximant comprises a weighted sum of the plurality of RBFs using the respective weight functions, and wherein the operation of generating the 3D object further comprises causing the 3D avatar to be displayed according to the body of the 3D avatar, the piece of clothing, and the outer clothing cage.

\* \* \* \* \*